Figure 1:
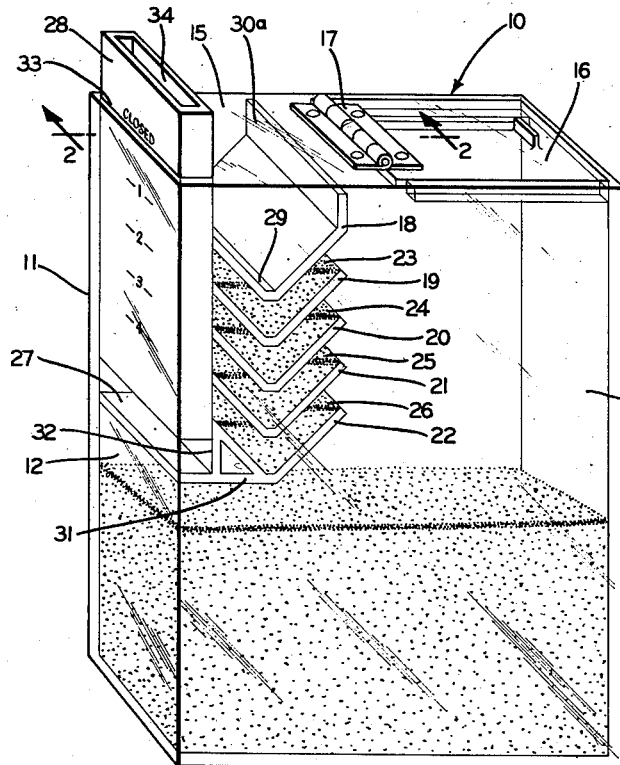

July 16, 1957 R. BERNHARDT 2,799,436
DEVICES FOR DISPENSING MEASURED AMOUNTS
Filed March 2, 1956 2 Sheets-Sheet 1

INVENTOR.
Robert Bernhardt
BY Frease & Bishop
ATTORNEYS

July 16, 1957 R. BERNHARDT 2,799,436
DEVICES FOR DISPENSING MEASURED AMOUNTS
Filed March 2, 1956 2 Sheets-Sheet 2
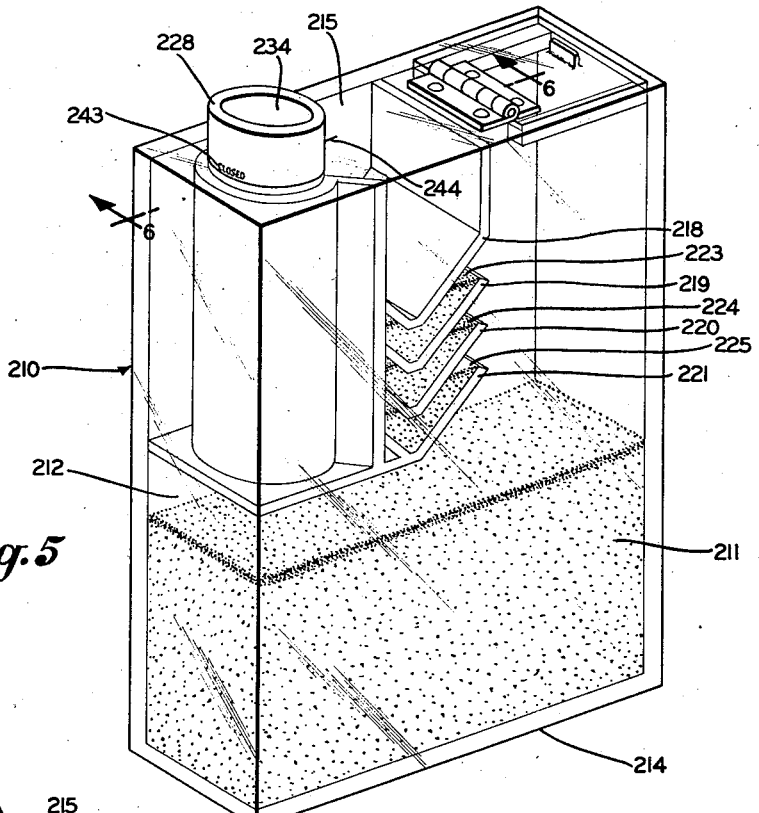
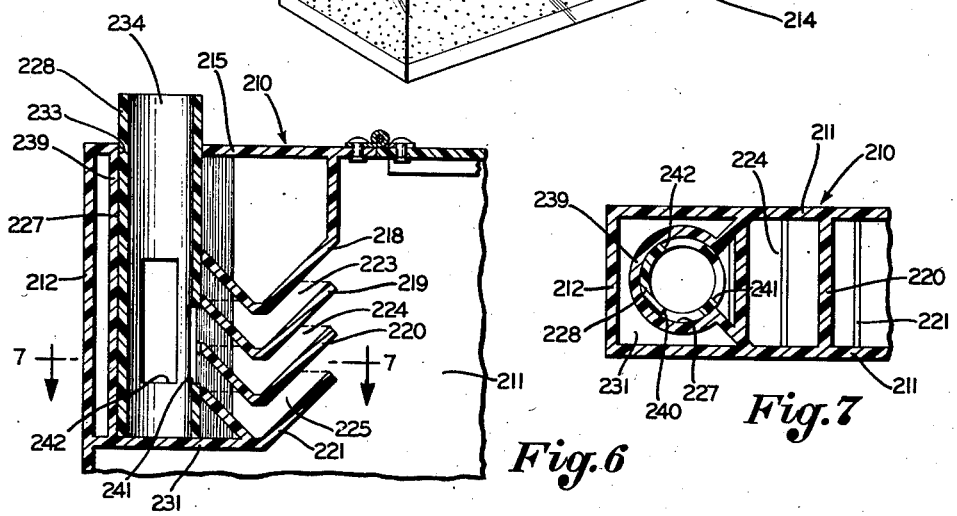
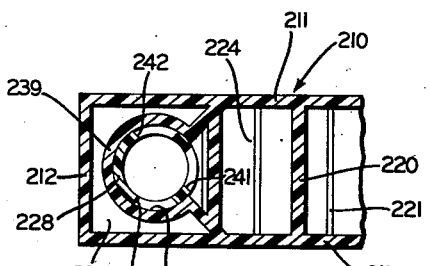
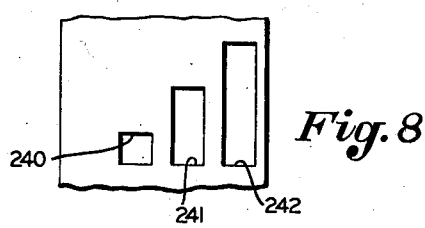
INVENTOR.
Robert Bernhardt
BY
Frease & Bishop
ATTORNEYS

United States Patent Office 2,799,436
Patented July 16, 1957

2,799,436

DEVICES FOR DISPENSING MEASURED AMOUNTS

Robert Bernhardt, Canton, Ohio

Application March 2, 1956, Serial No. 569,158

12 Claims. (Cl. 222—429)

My invention relates to a dispensing device for dispensing predetermined amounts of powdered or granular material, and more specifically to a construction of device of such a character, which may be formed as an integral part of a container or may be constructed for insertion in the container, or the like, in which the powdered or granular material is packed for sale. Still more specifically, my invention relates to a construction of device for dispensing measured amounts of powdered or granular material, which device may be selectively adjusted for dispensing different predetermined amounts as desired.

Many types of powdered or granular material such as, for instance, various types of soaps, salt or sugar, are offered for sale in conventional cardboard containers or boxes. The usual method of dispensing this powdered or granular material from such a container is to make an opening in the top or side wall of the container and merely pour the contents of the container therefrom every time an amount is to be used.

The principal difficulty with this means of dispensing common powdered or granular materials which are frequently used in everyday living is that it is impossible to determine the amount being dispensed, unless the material is poured from a container into a measuring device such as a measuring cup or measuring spoons. Since the use of such an extra measuring device is somewhat troublesome, the person dispensing the material from the container frequently does not use any measuring device, but merely attempts to gauge the amount being dispensed by eye, thereby resulting in a considerable waste of the powdered or granular material since an excessive amount over that needed is usually used.

Certain prior constructions of devices for dispensing measured amounts of powdered or granular material have been provided, all of which generally have included a measured size chamber formed within the container in which the powdered or granular material is held. Further, this chamber has usually been provided with an opening near the top thereof communicating with the confines of the container, and a second opening at the top thereof communicating outside of the container. Thus, upon upending the container, the chamber will be filled to a predetermined level from within the confines of the container, and by completely upending the container, the amount of material contained in the chamber is poured from the chamber through the top opening thereof outside of the container.

These prior constructions of dispensing devices have been satisfactory where it is always desired to dispense one set predetermined amount. As is frequently the case, however, in the use of soap, salt or sugar, different amounts of the material are desired at different times, so that it is desirous to provide a device for dispensing measured amounts of powdered or granular material which is adjustable for dispensing different predetermined amounts at different times.

Some prior constructions of adjustable devices for dispensing measured amounts of powdered or granular material have been provided, one of which includes a pair of spaced laterally extending members positioned extending vertically from the bottom wall of a container and between the sides thereof, forming an upwardly opening measuring chamber. A second or dispensing chamber is formed adjacent the measuring chamber, with the dispensing chamber extending from the bottom to the top of the container and being provided with a hollow vertically slidable chute therein.

Finally, an opening is formed through one of the members forming the measuring chamber providing communication between the measuring chamber and the dispensing chamber. Thus, by sliding the chute upwardly and downwardly, the opening between the chambers may be adjusted to any desired amount, so that upon upending the container, the powdered or granular material passes from the measuring chamber to the dispensing chamber and ultimately out through the chute, with the amount of material being dispensed being determined by the size of the opening between these two chambers.

One of the principal difficulties with this type of adjustable measuring device is that the measuring chambers thereof will always fill the dispensing chamber to the height of the opening therebetween caused by the particular adjustment of the chute, so that if at any time it is desired to decrease the amount to be dispensed the next time the container is upended, both of these chambers must first be emptied of any material before the chute can be adjusted downwardly. Otherwise, it will be necessary to force the chute through the material which is contained in the container, and even if this is successfully done, the amount which will be dispensed the next time the container is upended will be an incorrect amount from that desired, since the dispensing chamber will be filled to a greater height than the opening between this dispensing chamber and the measuring chamber.

It is therefore a general object of the present invention to provide a device for dispensing measured amounts of powdered or granular material which overcomes and eliminates the disadvantages of the prior constructions hereinbefore discussed.

It is a primary object of the present invention to provide a device for dispensing measured amounts which is constructed for dispensing powdered or granular material.

It is a further object of the present invention to provide a device for dispensing measured amounts in which the amount to be dispensed may be easily and conveniently adjusted prior to upending the container and dispensing said predetermined amount.

It is still a further object of the present invention to provide a device for dispensing measured amounts which is provided with a series of dispensing chambers, one or more of which may be selectively emptied upon upending the container, thereby dispensing a predetermined amount of material from the container.

It is also an object of the present invention to provide a device for dispensing measured amounts in which the amount to be dispensed is easily and conveniently adjusted, and no emptying of any dispensing chambers is required prior to setting this adjustment in order to dispense an accurate predetermined amount.

It is an additional object of the present invention to provide a device for dispensing measured amounts which may be constructed as an integral part of a container, or may be constructed for insertion in a container in which granular or powdered material is purchased.

It is still an additional object of the present invention to provide a device for dispensing measured amounts which may be selectively adjusted for dispensing any one of a number of different amounts of powdered or granular material by merely extending a slidable chute to a given position or by rotating a chute to a given position, depending on the particular form of the construction used.

Finally, it is an object of the present invention to provide a device for dispensing measured amounts which satisfies all of the above objects, yet is simple in construction and operation, and may be manufactured at a relatively low cost of both material and labor.

These and other objects are accomplished by the parts, constructions, arrangements, combinations and subcombinations comprising the present invention, the nature of which is set forth in the following general statement, preferred embodiments of which—illustrative of the best mode in which applicant has contemplated applying the principles—are set forth in the following description and illustrated in the accompanying drawings, and which are particularly and distinctly pointed out and set forth in the appended claims forming a part hereof.

In general terms, the device for dispensing measured amounts comprising the present invention may be stated as including in a container, a series of spaced members forming a series of measuring chambers. The chambers are preferably generally V-shaped in cross-section, open at the front and back ends and closed at the sides, with the apices positioned intermediate the opened ends.

Further, the measuring chambers are preferably vertically aligned and may be of equal size. Still further, the members are positioned with the chambers opening into the confines of the container at said chamber back ends and opening into a dispensing or discharge chamber at said chamber front ends.

The discharge chamber is provided with an adjustable member for selectively sealing off the front ends of a predetermined number of measuring chambers from the discharge chamber. Also, the discharge chamber is provided with an opening communicating with the exterior of the container.

Thus, the container may be filled with powdered or granular material and upended for filling the measuring chambers. Thereafter, upon again upending the container, the measuring chambers not sealed from the discharge chamber will each deposit a predetermined amount of the material into said discharge chamber, and this deposited material will thereafter pass through the discharge chamber opening to the exterior of the container, while at the same time, all of the measuring chambers having material deposited therefrom will be refilled with said material from the confines of the container through the measuring chamber opened back ends.

The discharge chamber adjustable member is preferably a hollow chute having an open outer end received through the discharge chamber opening, which chute may be selectively adjusted so that the sides of the chute seal off the predetermined number of measuring chambers from the discharge chamber. Further, the chute is formed so that the material from the unsealed measuring chambers is received within the chute when the container is upended and is discharged exterior of the container through the chute open ends.

The chute may be formed slidable of the discharge chamber and have an open inner end so that the material from the unsealed measuring chambers passes into the discharge chamber, then into the chute through the chute inner open end, and then out of the chute through the chute outer open end exterior of the container.

Also, the chute may be formed hollow cylindrical and rotatable of the discharge chamber, with a closed inner end and with an open outer end positioned extending through the discharge chamber opening. Further, the rotatable chute may be provided with circumferentially spaced openings formed therein in the axially extending wall thereof, with each opening being a different predetermined size for providing a communication between a predetermined number of measuring chambers and the confines of the chute when said openings are positioned in alignment with the front ends of the measuring chambers.

Thus, with the rotatable chute, the chute may be positioned with one of the chute openings aligned with the measuring chamber front ends, and upon upending the container, certain of said chambers will deposit a predetermined amount of the material into the chute, which material will pass through the chute outer open end.

Figure 4:
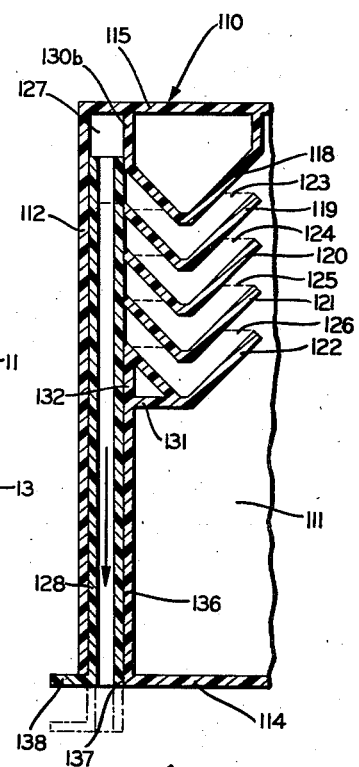
Figure 2:
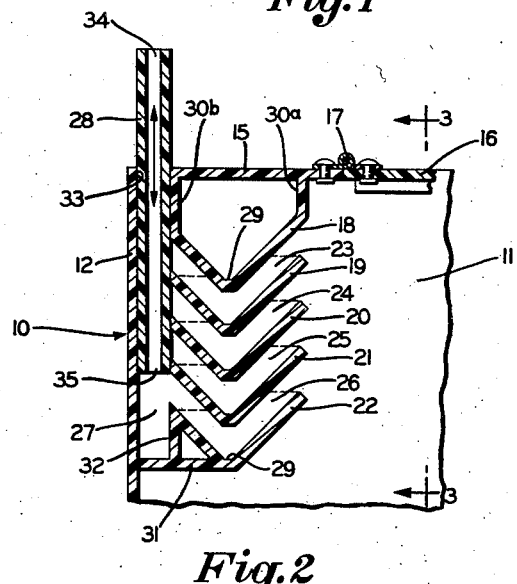
Figure 3:
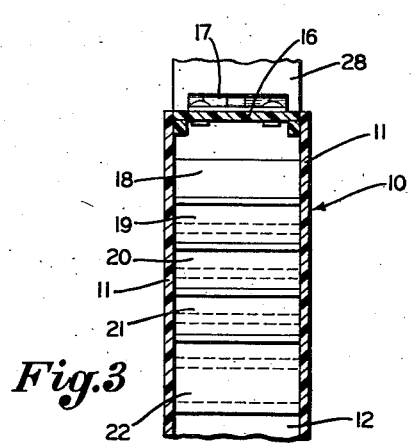

By way of example, embodiments of the improved device for dispensing measured amounts of the present invention are illustrated in the accompanying drawings forming a part hereof, wherein like numerals indicate similar parts throughout the several views, and in which:

Fig. 1 is a side perspective view of a container formed from transparent material and having the dispensing device formed as an integral part thereof;

Fig. 2, a fragmentary vertical sectional view looking in the direction of the arrows 2—2 in Fig. 1;

Fig. 3, a fragmentary vertical sectional view, part in elevation, looking in the direction of the arrows 3—3 in Fig. 2;

Fig. 4, a fragmentary vertical sectional view, similar to Fig. 2, but showing a second embodiment of the invention;

Fig. 5, a side perspective view, similar to Fig. 1, but showing a third embodiment of the present invention;

Fig. 6, a fragmentary vertical sectional view looking in the direction of the arrows 6—6 in Fig. 5;

Fig. 7, a fragmentary sectional view looking in the direction of the arrows 7—7 in Fig. 6; and Fig. 8, an expanded elevation of the outer surface of the chute in Figs. 5, 6 and 7 showing the predetermined size openings formed therein.

The device for dispensing measured amounts comprising the present invention may be formed as a separate unit for insertion into a container or box in which powdered or granular material is purchased, or may be formed as an integral part of the container, as illustrated and described herein. As shown in Fig. 1, the device may be formed as an integral part of the container generally indicated at 10, which container has the side vertically extending end wall 12, the back vertically extending end wall 13, the bottom horizontal wall 14 and the top horizontal wall 15.

The container 10 is preferably formed of plastic or other material which may be economically produced, and the top wall 15 thereof provided with an access door 16, hingedly connected to the top wall 15 by means of the hinge 17. Thus, the container 10 may be filled through the access door 16.

The device of the present invention, as shown in Fig. 1, is also preferably formed of plastic and is preferably positioned adjacent one of the upper corners of the container 10, with the side walls 11, front end wall 12 and top wall 15 of the container 10 forming a part of this device. The device includes a series of preferably vertically spaced partition members 18, 19, 20, 21 and 22, forming the measuring chambers 23, 24, 25 and 26. Further, the device includes a dispensing chamber 27 and a slidable chute 28.

The partition members 18, 19, 20, 21 and 22 are generally V-shaped in cross-section and are preferably mounted in vertical alignment between the container side walls 11, with the apices of these V-shaped members preferably being formed substantially midway between the front and back ends thereof. Further, the apices of these V-shaped members are preferably flattened as at 29, for a purpose to be hereinafter described.

The uppermost partition member 18 is provided with the extending portions 30a and 30b which extend from the back and front ends of member 18 to the top wall 15, thereby preventing any material from passing above member 18 into dispensing chamber 27. Further, the lowermost partition member 22 is provided with an extending portion 31, which connects the apex of member 22 to the front end wall 12 and also forms the bottom wall of the dispensing chamber 27, thereby preventing the material from passing beneath partition member 22 into the dispensing chamber 27.

Thus, the only means of communication between the inner confines of the container 10 and the dispensing chamber 27 is through the measuring chambers 23, 24, 25 and 26.

The dispensing chamber 27 is formed by the inner ends of the partition members 18, 19, 20, 21 and 22, and the extending portion 30b, in combination with the side walls 11 and the front end wall 12 of the container 10. Also, an extending portion 32 of the lowermost partition member 22 extends vertically downwardly from the forward end of member 22 to the extending portion 31, thereby forming a part of the back of dispensing chamber 27 and serving a purpose to be hereinafter described.

An opening 33 is formed at the top of the dispensing chamber 27 through the top wall 15 of container 10, and chute 28 is received through opening 33 slidably within the dispensing chamber 27 between the side walls 11, and between the front end wall 12 and the forward ends of partition members 18, 19, 20, 21 and 22. When the chute 28 is slid downwardly to its lowermost position, as shown in Fig. 1, the lower end thereof is received between the extending portion 32 of partition member 22 and the front end wall 12 of container 10, so that the forward open ends of the measuring chambers 23, 24, 25 and 26 are closed off by the chute 28.

Chute 28 is formed of tubular construction having the upper open end 34 and the lower open end 35. Further, preferably the front wall of chute 28 is provided with the graduations 36 for indicating the vertical position of chute 28 in reference to the measuring chambers 23, 24, 25 and 26, with these indications being read at the top wall 15 of container 10.

Thus, the container 10 may be filled with powdered or granular material through the access door 16 as shown in Fig. 1. Thereafter, with the chute 28 in closed position, that is, with the lower end thereof extending downwardly between the extending portion 32 and the front end wall 12, sealing off the forward ends of the measuring chambers 23, 24, 25 and 26, the container 10 may be upended, filling the measuring chambers 23, 24, 25 and 26 with the material, as shown.

Once the measuring chambers 23, 24, 25 and 26 have been filled, if it is desired to dispense an amount of material from container 10, it is merely necessary to slide the chute 34 upwardly to expose the forward ends of a given number of measuring chambers 23, 24, 25 and 26, and upon upending the container 10, a predetermined amount of the material will flow from these exposed measuring chambers into dispensing chamber 27, into the lower open end 35 of chute 28, through chute 28 and out the open upper end 34 exterior of container 10. As shown in Fig. 2, the chute 28 has been slid upwardly to expose the lowermost measuring chamber 26 to the dispensing chamber 27.

The amount of material which will flow from the measuring chambers 23, 24, 25 and 26 which are exposed to the dispensing chamber 27 will not be the total amount of material held in these measuring chambers, but rather will be a predetermined portion thereof, so that by experiment it is possible to form the measuring chambers of proper size to dispense a predetermined amount of material from each of these chambers as desired. The amount of material that will flow from each of these exposed measuring chambers into the dispensing chamber 27 when container 10 is upended will be an amount somewhat less than the total but greater than one-half of the capacity of each of these measuring chambers.

Thus, the line of demarcation between the material that will flow into dispensing chamber 27 and that which will remain in the measuring chambers is at some point rearwardly of the apices of these chambers, or rearwardly of the apices of partition members 18, 19, 20, 21 and 22. This is caused by the generally V-shaped configuration of the measuring chambers 23, 24, 25 and 26.

Also, this generally V-shaped configuration is the reason why the powdered or granular material which is contained within the confines of the container 10 but not within these measuring chambers will not continue to flow through the measuring chambers into dispensing chamber 27, which flow would destroy the purpose of the device. Since these measuring chambers are formed generally V-shaped, this does not provide a straight passage therethrough but, rather, forms an obstruction as the container 10 is upended, thereby preventing any additional material from flowing through these measuring chambers from the confines of the container 10, until the container 10 is once again moved toward an upright position.

After first filling the measuring chambers 23, 24, 25 and 26 in the manner described above, every time a portion of the material is dispensed from these measuring chambers into the dispensing chamber 27 by upending chamber 10, if container 10 is again placed in an upright position, additional material will flow from within the confines of container 10 into those measuring chambers from which a portion of the material contained therein has been removed, once again filling these chambers. In this manner, all of the material contained within the container 10 may be dispensed therefrom in predetermined measured amounts.

It is preferred that all of the measuring chambers 23, 24, 25 and 26 are formed of equal size, but these chambers may be formed of unequal sizes, dependent on the quantities of material that it is desired to dispense. Further, these measuring chambers may be formed of any equal or unequal size merely by increasing the distance between the partition members 18, 19, 20, 21 and 22 and the lengths of these partition members.

It has been found by providing the flats 29 on the partition members, that it is possible to dispense a greater portion of the total capacity of the measuring chambers 23, 24, 25 and 26 as the container 10 is upended. It is possible, therefore, by providing the flats 29, to increase the useful capacity of these measuring chambers without increasing the length thereof, and thereby provide a more compact unit.

The device for dispensing measured amounts comprising the present invention may be constructed of a multitude of forms and shapes and may be positioned in other portions of a container or box other than a top corner thereof. It is, therefore, not intended to limit the principles of the present invention to the exact size, shape and configuration of the various embodiments of the device illustrated and described herein.

The measuring chambers 23, 24, 25 and 26, for instance, may be of a greater or lesser number and rather than being triangular in configuration could be formed in an arcuate member. The important feature is that the forward and rearward portions of these measuring chambers are angled generally upwardly at opposited disposed angles, since this feature, as described above, prevents the main portion of the powdered or granular material contained within the confines of container 10 from passing directly through these measuring chambers into the dispensing chamber 27.

Further, the chute 28 may be formed of various sizes and shapes and could be solid rather than hollow, to merely serve the purpose of closing off a given number of measuring chambers from the dispensing chamber, with the material being dispensed merely passing out of the dispensing device through a stationary chute. A still further form of chute, that is, one which opens and dispenses vertically downwardly rather than upwardly, is shown in the second embodiment in Fig. 4.

Referring to Fig. 4, the second embodiment includes similar partition members 118, 119, 120, 121 and 122 forming similar measuring chambers 123, 124, 125 and 126. Also, a similar dispensing chamber 127 is formed between the side walls 111, and between the front end wall 112 and the forward ends of the partition members.

In this second embodiment, however, an additional partition member 136 extends from the point of juncture between the extending portions 131 and 132 of partition member 122 vertically downwardly to the bottom wall 114 of the container 110. Further, the top wall 115 of container 110 extends across the top of the dispensing chamber 127, forming a closed top wall on chamber 127, while the bottom wall thereof is eliminated and an opening 137 is formed in the bottom wall 114 forming an open bottom on the dispensing chamber 127.

Still further, a slidable chute 128 is received through opening 137 and extends from bottom wall 114 vertically upwardly within dispensing chamber 127 across the forward open ends of measuring chambers 123, 124, 125 and 126. Chute 128 is provided with a finger tab 138 which abuts the bottom portion of the front end wall 112 of container 110 when chute 128 is in closed position, with the upper end of this chute closing off the forward ends of all of the measuring chambers and extending above the uppermost measuring chamber 123 between the front end wall 112 and the extending portion 130b of partition member 118.

The construction of the second embodiment operates in substantially the same manner as in the first embodiment, that is, chute 128 may be fully retracted to completely close the container 110 or may be extended to expose the forward open ends of any number of the measuring chambers 123, 124, 125 and 126 to the dispensing chamber 127. The principal difference is that when the container 110 is upended, the material from the exposed measuring chambers will flow into dispensing chamber 127, but will not flow through the tubular chute 128 and out of the container 110 until the container is again placed in an upright position.

The third embodiment of the device for dispensing measured amounts is shown in Figs. 5, 6, 7 and 8 and is similar to the first two embodiments with the exception that the slidable chute of the first two embodiments is replaced by a rotatable chute and three rather than four measuring chambers are provided. Similar to before, the device includes the partition members 218, 219, 220 and 221 forming the measuring chambers 223, 224 and 225.

In the third embodiment, as shown in Fig. 7, the forward ends of the partition members 218, 219, 220 and 221 angle inwardly at oppositely disposed angles and are abutted by a dispensing chamber housing 239, which housing forms a generally vertically extending cylindrical dispensing chamber 227. Dispensing chamber 227 is closed at the bottom by the extending portion 231 of partition member 221, which extends from member 221 to the front end wall 212 of the container 210.

Further, an opening 233 is formed through the top wall 215, as before, so that the dispensing chamber 227 opens upward of the container 210. Also, the wall of the dispensing chamber housing 239 is preferably spaced rearwardly from the front end wall 212, merely for convenience of construction.

A hollow cylindrical chute 228 is rotatably mounted in the dispensing chamber 227, preferably with the upper end thereof extending through and beyond the top wall 215 of container 210. Chute 228 is provided with an upper open end 234 and the bottom end thereof preferably bears against the extending portion 231 of partition member 221, as shown in Fig. 6.

When the dispensing device is provided with the three measuring chambers 223, 224 and 225, as shown, the chute 228 is provided with three predetermined size openings 240, 241 and 242 preferably formed at 90° intervals around the circumference of chute 228 and having widths equal to the widths of the forwardmost end portions of partition members 218, 219, 220 and 221. The lower ends of the openings 240, 241 and 242 are all formed in substantial horizontal alignment with the edge of partition member 221, with the opening 240 extending upwardly across the forward open end of measuring chamber 225, opening 241 across the forward open ends of both measuring chambers 224 and 225 and opening 242 extending across the forward open ends of all three measuring chambers 223, 224 and 225.

As before stated, the forward ends of partition members 218, 219, 220 and 221 angle inwardly abutting the dispensing chamber housing 239 and also the forward ends of these partition members are formed to conform to the outer circumference of the cylindrical chute 228, so that a relatively tight fit is maintained therebetween while still permitting the chute 228 to rotate. Thus, with the chute 228 rotated to position the solid cylindrical wall thereof in alignment with the forward open ends of the measuring chambers 223, 224 and 225, the container 210 is completely closed.

Further, by selectively positioning the openings 240, 241 and 242 in alignment with the forward open ends of these measuring chambers, any predetermined number of the measuring chambers will dispense material contained therein into the chute 228 when the container 210 is upended. The material dispensed into chute 228 will flow through this chute and out the top opening 234 thereof, exterior of the container 210.

It should be understood that any number of measuring chambers may be provided and the openings in the chute 228 will be formed accordingly. Further, if desired, indications may be formed on the outer surface of the chute 228 above the top wall 212 of container 210, as shown in Fig. 5 at 243. Also, an indicating line 244 may be formed on the top wall 215, so that the indications 243 may be aligned therewith to place a predetermined size opening at the forward open ends of the measuring chambers as before described.

As hereinbefore described, in all three embodiments the chute is at all times freely adjustable within the dispensing chamber since none of the powdered or granular material contained within the confines of the container is permitted to enter the dispensing chamber until the chute has been properly adjusted and the container is upended. Prior to upending the container the entire predetermined amount of material is contained within the measuring chambers with the chute being freely adjustable in reference thereto.

Also, as shown in the three embodiments of the present invention, different predetermined amounts of material may be dispensed from the container and these amounts will remain accurate despite the adjustment of the chute mounted in the dispensing chamber. This, again, is due to the provision of a series of self-containing measuring chambers which do not permit any material to enter the dispensing chamber until the chute is properly adjusted and the container is upended.

A still further important feature of the invention is that in every case, despite the construction of the chute, the dispensing chamber may be formed so that the chute can be adjusted to completely close the container if such a construction is desired. In the embodiments shown, the container may be completely closed merely by sliding the slidable chutes to completely retracted position providing a solid wall of the chutes covering the forward open ends of all of the measuring chambers, or the rotatable chute may be rotated to a position in which a solid wall thereof closes all of the forward ends of all of the measuring chambers.

Thus, according to the principles of the present invention, a device for dispensing measured amounts is provided which overcomes and eliminates the disadvantages of the prior constructions discussed; which is constructed for dispensing powdered or granular material; in which the amount to be dispensed may be easily and conveniently adjusted prior to upending the container and dispensing said predetermined amount; which is provided with a series of dispensing chambers, one or more of which may be selectively emptied upon upending the container, thereby dispensing a predetermined amount of material from the container; in which the amount to be dispensed is easily and conveniently adjusted and no emptying of any dispensing chamber is required prior to setting the adjustment in order to dispense an accurate predetermined amount; which may be constructed as an integral part of the container or may be constructed for insertion in a container in which granular or powdered material is purchased; which may be selectively adjusted for dispensing any one of a number of different amounts of powdered or granular material by merely extending a slidable chute to a given position or by rotating a chute to a given position, depending on the particular form of the construction used; and which includes all of the above advantageous features, but yet is simple in construction and operation, and may be manufactured at a relatively low cost of both material and labor.

In the foregoing description, certain terms have been used for brevity, clearness and understanding, but no unnecessary limitations are to be implied therefrom, because such terms are used for descriptive purposes herein, and are intended to be broadly construed.

Moreover, the embodiments of the improved construction illustrated and described herein are by way of example, and the scope of the present invention is not limited to the exact details of the constructions shown.

Having now described the invention, the constructions, operation and use of preferred embodiments thereof, and the advantageous new and useful results obtained thereby; the new and useful constructions and reasonable mechanical equivalents thereof obvious to those skilled in the art are set forth in the appended claims.

I claim:

1. In a container, spaced partition members mounted within the confines of the container forming a series of measuring chamber means and a dispensing chamber, each of the measuring chamber means having forward and rearward open ends, said forward ends normally communicating with the dispensing chamber, said rearward ends communicating with the inner confines of the container, the dispensing chamber opening exterior of the container, adjustable means for selectively closing off the measuring chamber means forward ends from the dispensing chamber, the measuring chamber means each being formed with a portion between the open ends normally extending below said ends for normally retaining a predetermined amount of comminuted material contained in the container, and the measuring chamber means permitting at least a portion of said predetermined amount to flow into the dispensing chamber when the measuring chamber means forward ends are not closed off and when the container is upended while retaining the remainder of the material in the container from flowing into the dispensing chamber.

2. In a container, spaced partition members mounted within the confines of the container at least certain of which are generally V-shaped, said partition members forming a series of generally V-shaped measuring chambers and a dispensing chamber, each of the measuring chambers having forward and rearward open ends, said forward ends normally communicating with the dispensing chamber, said rearward ends communicating with the inner confines of the container, the dispensing chamber opening exterior of the container, adjustable means for selectively closing off the measuring chamber forward ends from the dispensing chamber, said V-shaped partition members being positioned so that a predetermined amount of comminuted material contained in the container is normally retained in each of the V-shaped measuring chambers, and the measuring chambers permitting at least a portion of said predetermined amount to flow into the dispensing chamber when the measuring chamber forward ends are not closed off and when the container is upended while retaining the remainder of the material in the container from flowing into the dispensing chamber.

3. In a container, spaced partition members mounted within the confines of the container at least certain of which are generally V-shaped and generally vertically aligned, said partition members forming a series of generally V-shaped vertically aligned measuring chambers and a dispensing chamber, each of the measuring chambers having forward and rearward open ends, said forward ends normally communicating with the dispensing chamber, said rearward ends communicating with the inner confines of the container, the dispensing chamber opening exterior of the container, adjustable means for selectively closing off the measuring chamber forward ends from the dispensing chamber, said V-shaped partition members being positioned so that a predetermined amount of comminuted materials contained in the container is normally retained in each of the V-shaped measuring chambers, and the measuring chambers permitting at least a portion of said predetermined amount to flow into the dispensing chamber when the measuring chamber forward ends are not closed off and when the container is upended while retaining the remainder of the material in the container from flowing into the dispensing chamber.

4. In a container, spaced partition members mounted within the confines of the container forming a series of measuring chamber means and a dispensing chamber, each of the measuring chamber means having forward and rearward open ends, said forward ends normally communicating with the dispensing chamber, said rearward ends communicating with the inner confines of the container, the dispensing chamber opening exterior of the container, slidably adjustable means for selectively closing off the measuring chamber means forward ends from the dispensing chamber, the measuring chamber means each being formed with a portion between the open ends normally extending below said ends for normally retaining a predetermined amount of comminuted material contained in the container, and the measuring chamber means permitting at least a portion of said predetermined amount to flow into the dispensing chamber when the measuring chamber means forward ends are not closed off and when the container is upended while retaining the remainder of material in the container from flowing into the dispensing chamber.

5. In a container, spaced partition members mounted within the confines of the container forming a series of measuring chamber means and a dispensing chamber, each of the measuring chamber means having forward and rearward open ends, said forward ends normally communicating with the dispensing chamber, said rearward ends communicating with the inner confines of the container, the dispensing chamber opening exterior of the container, rotatably adjustable means for selectively closing off the measuring chamber means forward ends from the dispensing chamber, the measuring chamber means each being formed with a portion between the open ends normally extending below said ends for normally retaining a predetermined amount of comminuted material contained in the container, and the measuring chamber means permitting at least a portion of said predetermined amount to flow into the dispensing chamber when the measuring chamber means forward ends are not closed off and when the container is upended while retaining the remainder of material in the container from flowing into the dispensing chamber.

6. In a container, spaced partition members mounted within the confines of the container at least certain of which are generally V-shaped and generally vertically aligned, said partition members forming a series of generally V-shaped vertically aligned measuring chambers and a generally vertically extending dispensing chamber, each of the measuring chambers having forward and rearward open ends, said forward ends normally communicating with the dispensing chamber, said rearward ends communicating with the inner confines of the container, the dispensing chamber opening exterior of the container, generally vertically extending and generally vertically slidable adjustable means received in the dispensing chamber for selectively closing off the measuring chamber forward ends from the dispensing chamber, said V-shaped partition members being positioned so that a predetermined amount of comminuted material contained in the container is normally retained in each of the V-shaped measuring chambers, and the measuring chambers permitting at least a portion of said predetermined amount to flow into the dispensing chambers when the measuring chamber forward ends are not closed off and when the container is upended while retaining the remainder of the material in the container from flowing into the dispensing chamber.

7. In a container, spaced partition members mounted within the confines of the container at least certain of which are generally V-shaped and generally vertically aligned, said partition members forming a series of generally V-shaped vertically aligned measuring chambers and a generally vertically extending dispensing chamber, each of the measuring chambers having forward and rearward open ends, said forward ends normally communicating with the dispensing chamber, said rearward ends communicating with the inner confines of the container, the dispensing chamber opening exterior of the container, generally vertically extending and rotatably adjustable means received in the dispensing chamber for selectively closing off the measuring chamber forward ends from the dispensing chamber, said V-shaped partition members being positioned so that a predetermined amount of comminuted material contained in the container is normally retained in each of the V-shaped measuring chambers, and the measuring chambers permitting at least a portion of said predetermined amount to flow into the dispensing chambers when the measuring chamber forward ends are not closed off and when the container is upended while retaining the remainder of the material in the container from flowing into the dispensing chamber.

8. In a container, spaced partition members mounted within the confines of the container at least certain of which are generally V-shaped, said partition members forming a series of generally V-shaped measuring chambers and a dispensing chamber, each of the measuring chambers having forward and rearward ends, said forward ends normally communicating with the dispensing chamber, said rearward ends communicating with the inner confines of the container, the dispensing chamber opening exterior of the container, a tubular chute mounted slidably adjustable in the dispensing chamber, said chute being adjustable for selectively closing off the measuring chamber forward ends from the dispensing chamber, said V-shaped partition members being positioned so that a predetermined amount of comminuted material contained in the container is normally retained in each of the V-shaped measuring chambers, and the measuring chambers permitting at least a portion of said predetermined amount to flow into the dispensing chamber and chute when the measuring chamber forward ends are not closed off and when the container is upended while retaining the remainder of the material in the container from flowing into the dispensing chamber and chute.

9. In a container, spaced partition members mounted within the confines of the container at least certain of which are generally V-shaped and generally vertically aligned, said partition members forming a series of generally V-shaped vertically aligned measuring chambers and a generally vertically extending dispensing chamber, each of the measuring chambers having forward and rearward open ends, said forward ends normally communicating with the dispensing chamber, said rearward ends communicating with the inner confines of the container, the dispensing chamber opening exterior of the container, a generally vertically extending tubular chute mounted vertically slidably adjustable in the dispensing chamber, said chute having side walls and open ends, said chute being selectively adjustable so that the chute side walls close off the measuring chamber forward ends from the dispensing chamber, said V-shaped partition members being positioned so that a predetermined amount of comminuted material contained in the container is normally retained in each of the V-shaped measuring chambers, and the measuring chambers permitting at least a portion of said predetermined amount to flow into the dispensing chamber and chute when the measuring chamber forward ends are not closed off and when the container is upended while retaining the remainder of the material in the container from flowing into the dispensing chamber and chute.

10. In a container, spaced partition members mounted within the confines of the container at least certain of which are generally V-shaped having apex portions intermediate their lengths, said partition members forming a series of generally V-shaped measuring chambers and a dispensing chamber, said generally V-shaped partition members having flat portions formed at the apex portions forming flat portions intermediate the lengths of the measuring chambers, each of the measuring chambers having forward and rearward open ends, said forward ends normally communicating with the dispensing chamber, said rearward ends communicating with the inner confines of the container, the dispensing chamber opening exterior of the container, adjustable means for selectively closing off the measuring chamber forward ends from the dispensing chamber, said V-shaped partition members being positioned so that a predetermined amount of comminuted material contained in the container is normally retained in each of the V-shaped measuring chambers, and the measuring chambers permitting at least a portion of said predetermined amount to flow into the dispensing chamber when the measuring chamber forward ends are not closed off and when the container is upended while retaining the remainder of the material in the container from flowing into the dispensing chamber.

11. In a container, spaced partition members mounted within the confines of the container at least certain of which are generally V-shaped, said partition members forming a series of generally V-shaped measuring chambers and a cylindrical dispensing chamber, each of the measuring chambers having forward and rearward open ends, said forward ends normally communicating with the dispensing chamber, said rearward ends communicating with the inner confines of the container, the dispensing chamber opening exterior of the container, a hollow cylindrical rotatable chute mounted in the dispensing chamber for selectively closing off the measuring chamber forward ends from the dispensing chamber, said V-shaped partition members being positioned so that a predetermined amount of comminuted material contained in the container is normally retained in each of the V-shaped measuring chambers, and the measuring chambers permitting at least a portion of said predetermined amount to flow into the dispensing chamber and chute when the measuring chamber forward ends are not closed off and when the container is upended while retaining the remainder of the material in the container from flowing into the dispensing chamber and chute.

12. In a container, spaced partition members mounted within the confines of the container at least certain of which are generally V-shaped and generally vertically aligned, said partition members forming a series of generally V-shaped vertically aligned measuring chambers and a vertically extending cylindrical dispensing chamber, each of the measuring chambers having forward and rearward open ends, said forward ends normally communicating with the dispensing chamber, said rearward ends communicating with the inner confines of the container, the dispensing chamber opening exterior of the container, a vertically extending hollow cylindrical rotatable chute mounted in the dispensing chamber, said chute having open ends and a series of different measured size openings formed through a cylindrical wall thereof, one of said partition members closing one of the chute open ends, the other of said chute open ends extending from the dispensing chamber exterior of the container, the chute being selectively adjustable between positions in which the chute cylindrical wall closes off the measuring chamber forward ends and positions in which one of the chute cylindrical wall openings is positioned in alignment with the measuring chamber forward ends opening a predetermined number of the measuring chamber forward ends, said V-shaped partition members being positioned so that a predetermined amount of comminuted material contained in the container is normally retained in each of the V-shaped measuring chambers, and the measuring chambers permitting at least a portion of said predetermined amount to flow into the dispensing chamber and chute through one of the chute wall openings when the measuring chamber forward ends are not closed off and when the container is upended while retaining the remainder of the material in the container from flowing into the dispensing chamber and chute.

References Cited in the file of this patent

UNITED STATES PATENTS 871,865   Felter _____ Nov. 26, 1907